US012260846B1

(12) United States Patent
Rivard et al.

(10) Patent No.: US 12,260,846 B1
(45) Date of Patent: Mar. 25, 2025

(54) TREMOLO SYSTEMS FOR FOLDABLE STRINGED INSTRUMENT AND RELATED METHODS

(71) Applicant: Ciari Guitars, inc., San Diego, CA (US)

(72) Inventors: Brent Rivard, Encinitas, CA (US); Jonathan Spangler, San Diego, CA (US)

(73) Assignee: Ciari Guitars, Inc., San Diego, CA (US)

(*) Notice: Subject to any disclaimer, the term of this patent is extended or adjusted under 35 U.S.C. 154(b) by 243 days.

(21) Appl. No.: 18/070,434

(22) Filed: Nov. 28, 2022

Related U.S. Application Data

(60) Provisional application No. 63/283,517, filed on Nov. 28, 2021.

(51) Int. Cl.

| | |
|---|---|
| ***G10D 1/08*** | (2006.01) |
| ***G10D 3/095*** | (2020.01) |
| ***G10D 3/12*** | (2020.01) |
| ***G10D 3/153*** | (2020.01) |

(52) U.S. Cl.
CPC ............. *G10D 3/153* (2020.02); *G10D 1/085* (2013.01); *G10D 3/095* (2020.02); *G10D 3/12* (2013.01)

(58) Field of Classification Search
CPC ........ G10D 3/153; G10D 3/095; G10D 1/085; G10D 3/12
See application file for complete search history.

(56) References Cited

U.S. PATENT DOCUMENTS

| | | | | |
|---|---|---|---|---|
| 4,111,093 | A * | 9/1978 | Field | G10D 3/095 984/106 |
| 8,273,974 | B1 * | 9/2012 | Gonzalez | G10D 1/085 84/293 |
| 9,424,818 | B1 * | 8/2016 | Spangler | G10D 1/08 |
| 10,810,974 | B2 * | 10/2020 | Spangler | G10D 3/18 |
| 10,810,977 | B2 * | 10/2020 | Glaser | G10D 3/06 |
| 11,120,776 | B2 * | 9/2021 | Spangler | G10D 3/095 |
| 11,151,969 | B2 * | 10/2021 | Glaser | G10D 3/04 |
| 11,404,032 | B2 * | 8/2022 | Spangler | G10D 1/08 |
| 11,443,722 | B2 * | 9/2022 | Spangler | G10D 1/08 |
| 11,631,386 | B2 * | 4/2023 | Spangler | G10D 3/12 84/291 |
| 11,783,800 | B2 * | 10/2023 | Spangler | G10D 1/08 84/267 |
| 11,967,300 | B2 * | 4/2024 | Glaser, II | G10D 1/085 |

* cited by examiner

*Primary Examiner* — Robert W Horn
(74) *Attorney, Agent, or Firm* — Jonathan D. Spangler; Jay B. Bell

(57) ABSTRACT

The present disclosure describes multiple tremolo systems for a foldable stringed instrument, for example a travel guitar. According to certain aspects, the tremolo systems disclosed herein are mounted to an actuator used to tighten or loosen the strings to enable playing or folding. The foldable stringed instrument folds mid-neck to assume a reduced profile.

15 Claims, 10 Drawing Sheets

TREMOLO SYSTEMS FOR FOLDABLE STRINGED INSTRUMENT AND RELATED METHODS

CROSS-REFERENCES TO RELATED APPLICATIONS

The present application is a non-provisional patent application claiming benefit under 35 USC Section 119 (e) from U.S. Provisional Patent Application Ser. No. 63/283,517 filed Nov. 28, 2021, entitled "Tremolo Systems for Foldable Stringed Instrument and Related Methods," the entire content of which is hereby expressly incorporated by reference into this disclosure as if set forth fully herein.

FIELD

The present invention relates generally to musical instruments and, more particularly, to tremolo systems for a foldable fretted stringed instrument (such as a guitar) for temporarily raising and/or lowering the string pitch.

BACKGROUND

Stringed instruments, such as guitars, have enjoyed among the highest popularity among musical instruments. Most stringed instruments have a solid neck rigidly coupled to either a hollow or solid body. This construction, while aiding in predictable tuning and quality of play, render many stringed instruments cumbersome for travel (e.g., air, train, auto, etc.), particularly given the additional bulk of the associated case (hard or soft). While various stringed instruments have been attempted to make it easier and/or more convenient to travel with or store these stringed instruments, most are simply smaller or scaled down versions of their traditional counterparts, which still present challenges for travel and/or predictable tuning and quality of play. While adding convenience, prior foldable stringed instruments were not suited for certain add-on features, such as tremolo systems to temporarily attenuate (raise and/or lower) the pitch of one or more strings on the instrument. The present invention is directed at solving this unmet need.

SUMMARY

The present disclosure accomplishes this goal by providing multiple tremolo systems for a foldable stringed instrument. According to certain aspects, the tremolo systems disclosed herein are mounted to an actuator used to tighten or loosen the strings to enable playing or folding. The foldable stringed instrument folds mid-neck to assume a reduced profile. While referred to hereinafter within the context of an electric travel guitar, it will be appreciated that the scope of the invention extends beyond guitars and may include, by way of example only, any of a variety of stringed instrument that would benefit from a reduced profile for ease of travel and/or storage (e.g., acoustic guitar, bass guitar, ukulele, etc.).

In one embodiment, a tremolo cam having an oblong cross-section is rotatably mounted to the actuator underneath the strings as they pass from a floating tail piece to a string roller assembly. The tremolo cam is coupled to a tremolo bar that extends through an aperture from the top surface of the guitar body. When the tremolo bar is rotated by a user, the tremolo cam will rotate to contact and stretch the strings to temporarily raise the string pitch.

In another embodiment, the string roller assembly of the actuator is mounted between a pair of rocker assemblies. Each rocker assembly is capable of moving back and forth along the longitudinal axis of the actuator. An axle is rotatably mounted to the actuator and includes a threaded post extending towards the top surface of the guitar body for threaded engagement with the tremolo bar. The axle is connected to the rocker assemblies via a pair of linkages, which serve to push or pull the rocker assemblies (and string roller assembly) depending on the rotation of the axle. Rotation of the tremolo bar (extending through guitar body) causes the rocker assemblies (and string roller assembly) to move back or forth to respectively raise or lower the string pitch.

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein.

DETAILED DESCRIPTION OF A PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The tremolo systems for foldable fretted instruments and related methods disclosed herein boasts a variety of inventive features and components that warrant patent protection, both individually and in combination.

Figure 1:
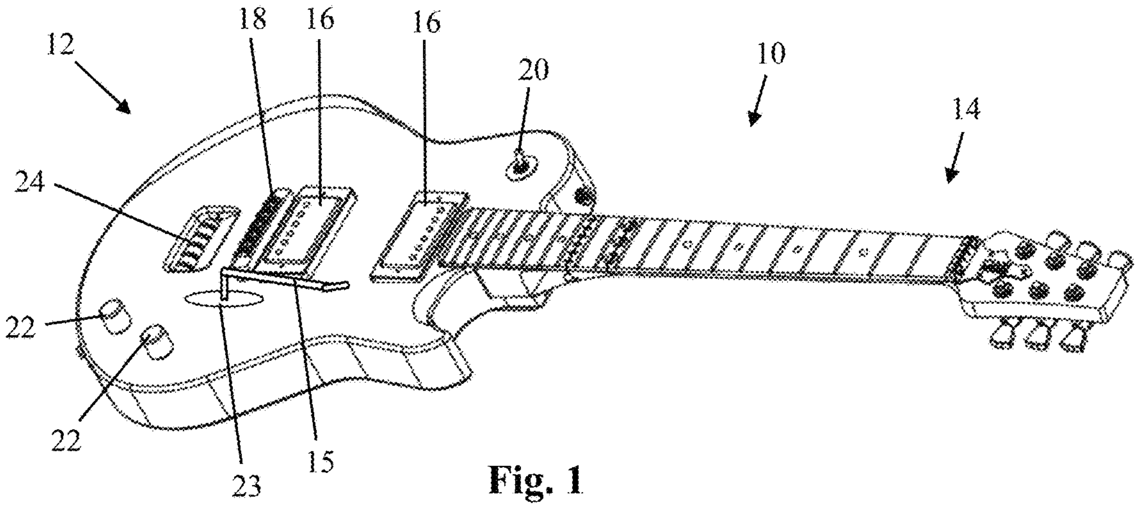
FIGS. 1-3 are perspective, side, and bottom views of an example of a foldable fretted instrument with a first tremolo system according to aspects of the present disclosure.
Figure 2:
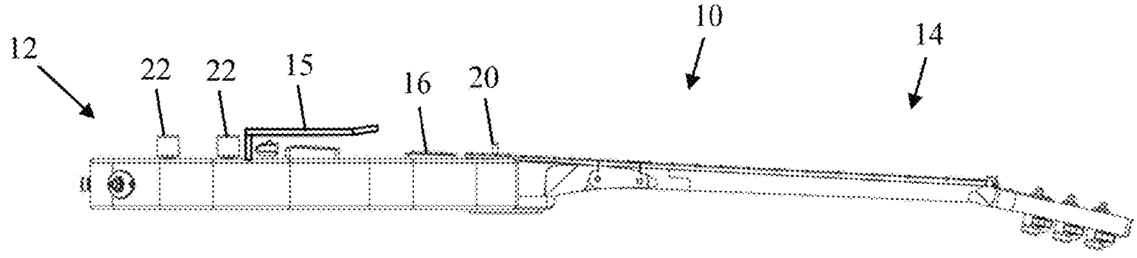
Figure 3:
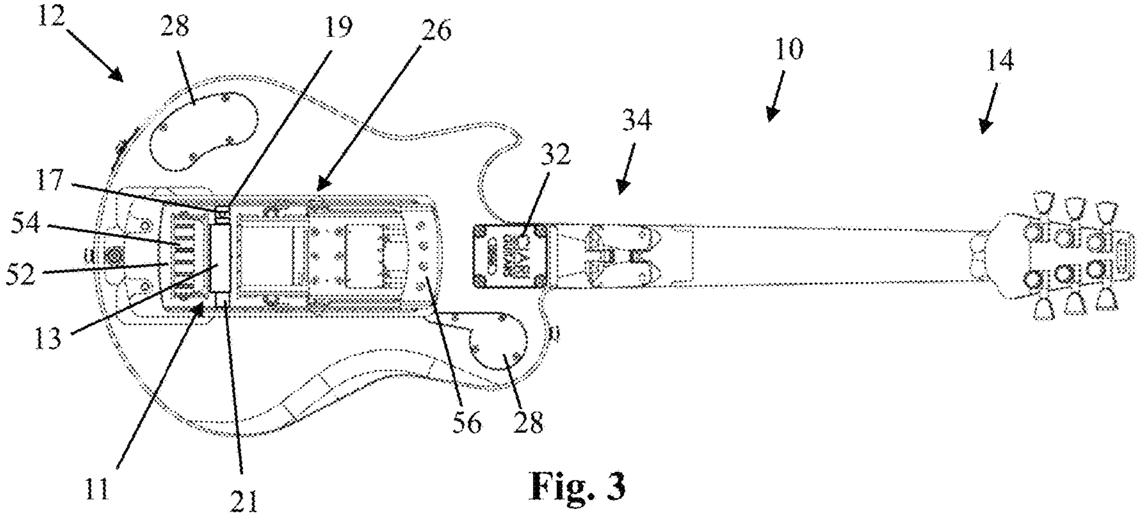

FIGS. 1-3 show an example of a foldable fretted instrument 10 having a body 12 and a neck 14 extending therefrom, according to some embodiments of the present disclosure. Although shown by way of example only as an electric guitar, it will be appreciated that aspects of the foldable fretted instrument 10 described herein may be used in any of a variety of other fretted instruments, including but not limited to acoustic guitars, ukuleles, banjos, bass guitars, etc. By way of example, the body 12 may include a host of standard components, such as (but not limited to) pick-ups 16, a roller bridge 18, a pick-up selector switch 20, and tone and volume controls 22. The body 12 may also include a string aperture 24, through which strings pass from an actuator 26 disposed in a back recess of the body 12 (FIG. 3). In some embodiments, the actuator may include a chassis 52 with a number of components for tightening and loosening the strings of the instrument 10, including a string roller assembly 54, as shown and described in detail in commonly owned and co-pending U.S. patent application Ser. No. 17/994,248, filed Nov. 25, 2022 and entitled "Foldable Stringed Instrument and Related Methods," the entire contents of which are hereby incorporated by reference into this disclosure as if set forth fully herein.

In some embodiments, the back of the body 12 includes an electronic cover 28 and a switch cover 30. The neck 14 may be coupled to the body 12 via a neck plate 32 secured with multiple fasteners (e.g., bolts) that threadedly engage a mid-neck hinge assembly 34 forming part of the neck 14. With the operation of the actuator 26, along with the mid-neck hinge assembly 34, the instrument 10 is capable of folding in half for convenient transportation and/or storage. When a user wants to play again, the neck can be straightened out before operating the actuator 26 to tighten the strings and lock the neck 14 so the instrument 10 may be tuned and/or played.

According to aspects of the present disclosure, a first tremolo system 11 includes a tremolo cam 13 for selectively contacting and stretching the strings for temporary string attenuation, a tremolo bar 15 for a user to rotate from the top surface of the body 12, a bar coupler 17 to couple the tremolo bar 15 to the tremolo cam 13, and mounting knuckles 19, 21 for rotatably mounting the tremolo cam 13 and bar coupler 17 to the actuator 26. By way of example only, the tremolo cam 13 has an oblong (e.g., oval, elliptical, etc.) cross-sectional shape and is rotatably mounted to the actuator 26 via first mounting knuckle 19 and a second mounting knuckle 21. The strings are located above the tremolo cam 13 as they pass from a floating tail piece (not shown) to a string roller assembly 54. In some embodiments, the tremolo cam 13 is coupled to a tremolo bar 15 that extends through an aperture 23 from the top surface of the instrument body 12. When the tremolo bar 15 is rotated by a user, the tremolo cam 13 will rotate to contact and stretch the strings to temporarily raise the string pitch. In some embodiments, a pick guard (not shown) may be used to cover the tremolo bar aperture 23.

Figure 4:
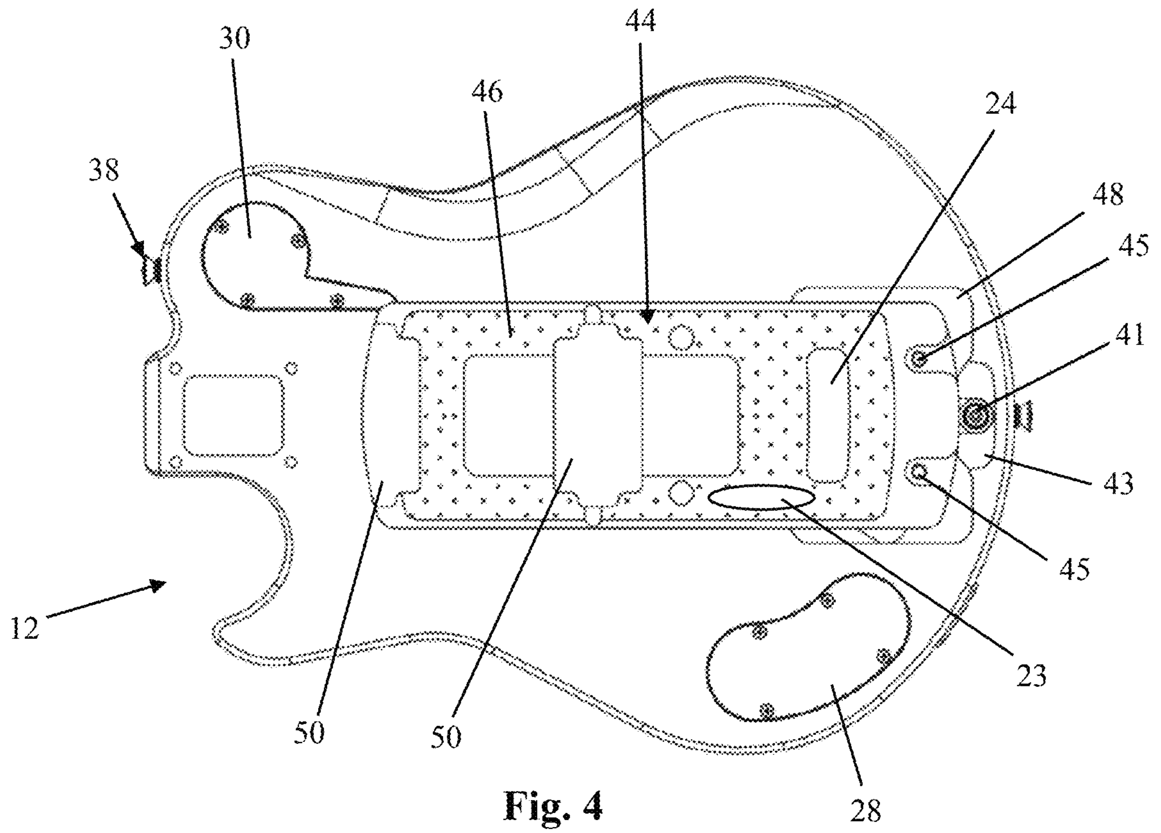
FIGS. 4-5 are bottom and perspective views of an example of a body of the foldable fretted instrument of FIGS. 1-3 showing an aperture formed in the body to accommodate a first tremolo system according to aspects of the present disclosure.
Figure 5:
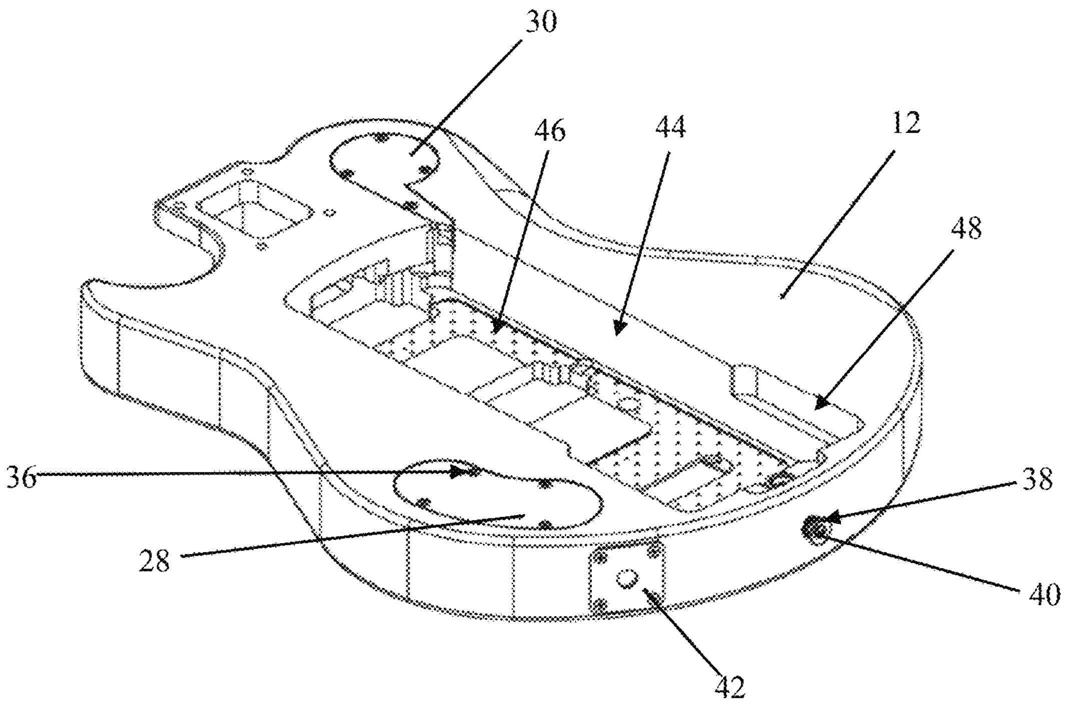

FIGS. 4-5 show the body 12 of the foldable fretted instrument 10 of FIGS. 1-3 according to aspects of the present disclosure, including the tremolo bar aperture 23 dimensioned to pass the tremolo bar 15 from the upper surface of the instrument 10. In some embodiments, the back of the body 12 includes an electronic cover 28 and a switch cover 30, both of which are preferably coupled to the body 12 via a plurality of wood screws 36 or comparable fasteners. In some embodiments, strap buttons 38 may be provided for coupling to a guitar strap (not shown), which buttons are coupled to the body 12 via wood screws 40 or comparable fasteners. In some embodiments, an input jack plate 42 is also coupled to the body 12, which may be used to electrically couple the guitar 10 to an amplifier or other output device (e.g., wireless headphones, etc.). In some embodiments, the body 12 may include a back recess 44 for housing the actuator 26 (within a chassis recess 46) and for receiving the headstock of the neck 14 while in the folded state (within the headstock recess 48). In addition to the string aperture 24, in some embodiments the body 12 may include pick-up apertures 50 to receive the pick-ups 16 shown in FIGS. 1-3.

In some embodiments, the body 12 may include a series of magnets for releasably securing various aspects of the guitar 10 while in the folded state. By way of example only, these magnets may include, but are not necessarily limited to, a headstock magnet 41 disposed within an upper landing 43 of the headstock recess 48, as well as a pair of handle magnets 45 disposed in raised sections on the lower surface of the headstock recess 48 of the back recess 44. For example, the headstock magnet 41 cooperates magnetically with ferrous (metal) aspects on the back surface of the headstock of the neck 14 while in the folded state, which ferrous aspects may include (but are not limited to) a magnet mounted to the back surface of the headstock and/or the tuners located on the back of the headstock. In some embodiments, the handle magnets 45 cooperate magnetically with ferrous (metal) aspects of the handle 56 when the handle 56 is positioned in the unlocked state, after it has been rotated from the locked state shown in FIG. 3 such that the handle 56 is located within the headstock recess 48. This magnetic coupling will allow the handle 56 to be retained in the unlocked position while the instrument 10 is in the folded state according to aspects of the present disclosure. By way of example only, when it is desired to return the instrument 10 to the playing state, a user need only: a) straighten the neck; b) pull the handle 56 away from magnetic coupling with the handle magnets 45; and c) rotate the handle 56 back into the locked state shown in FIG. 3.

Figure 6:
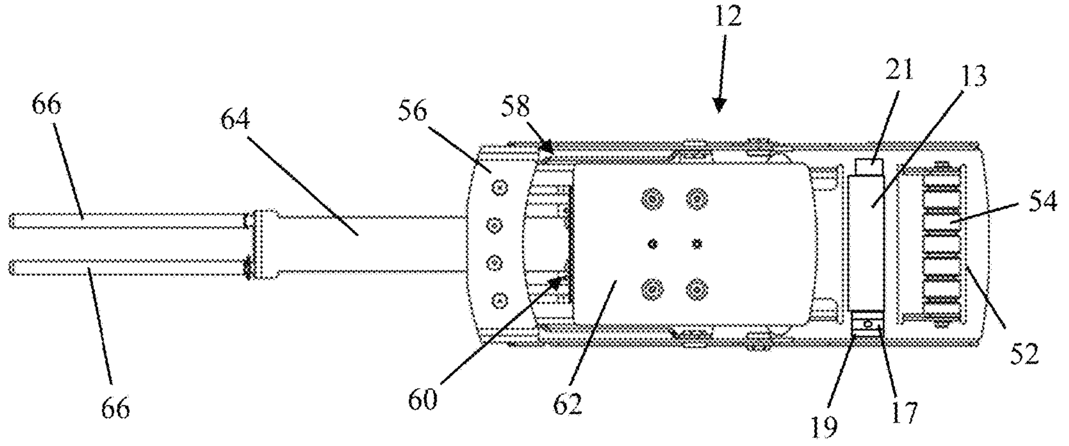
FIG. 6 is a top view of an example of an actuator assembly forming part of the foldable fretted instrument of FIGS. 1-3 with a first tremolo system according to aspects of the present disclosure.

FIG. 6 shows the actuator assembly 26 of the foldable fretted instrument 10 of FIGS. 1-3 with a first tremolo system 11 according to aspects of the present disclosure. By way of example only, the actuator assembly 26 includes a chassis 52 to be mounted within the chassis recess 46, such as through the use of any suitable adhesives and/or mechanical coupling (e.g., screws, plates, etc.). The chassis 52 serves as a vehicle to carry or otherwise mount a variety of components, for example including (but not necessarily limited to) a string roller assembly 54, a handle 56, linkage 58, a lock chassis 60, and a cover 62 mounted on an upper surface of the lock chassis 60. In some embodiments, a ramrod 64 having a pair of locking rods 66 is coupled to the lock chassis 60. As will be described below, when the handle 56 is rotated from the position shown (locked) to a position approximately 180 degrees therefrom (unlocked), the lock chassis 60 will translate towards the string roller assembly 54 and thereby release a floating tail piece (not shown), which in turn will loosen the strings 5 of the instrument 10 such that the mid-neck hinge 34 (see, e.g., FIG. 3) can be used to fold the instrument 10 in half (for example). When a player wants to play the instrument 10 again, the neck 14 will be straightened and then the handle 56 rotated back into the position shown, which causes the lock chassis 60 to translate towards the headstock of the neck 14 and thereby push the floating tail piece (not shown) to tighten the strings so the instrument 10 can be tuned and/or played.

By way of example only, FIG. 6. depicts an actuator assembly 26 having a first tremolo system 11, shown before operation. In some embodiments, tremolo cam 13 is oblong in cross section. The tremolo bar coupler 17 rotates within the first mounting knuckle 19 and is rigidly connected to the tremolo cam 13. The tremolo bar coupler 17 has a threaded post 25 (FIG. 7) extending towards the body 12, which is threadedly received within a threaded distal end 27 of the tremolo bar 15. When the tremolo bar 15 is connected to the tremolo bar coupler 17 (e.g., via threaded engagement), then rotation of the tremolo bar 15 will cause the tremolo cam 13 to contact and bend the strings 5 for temporary pitch attenuation.

Figure 7:
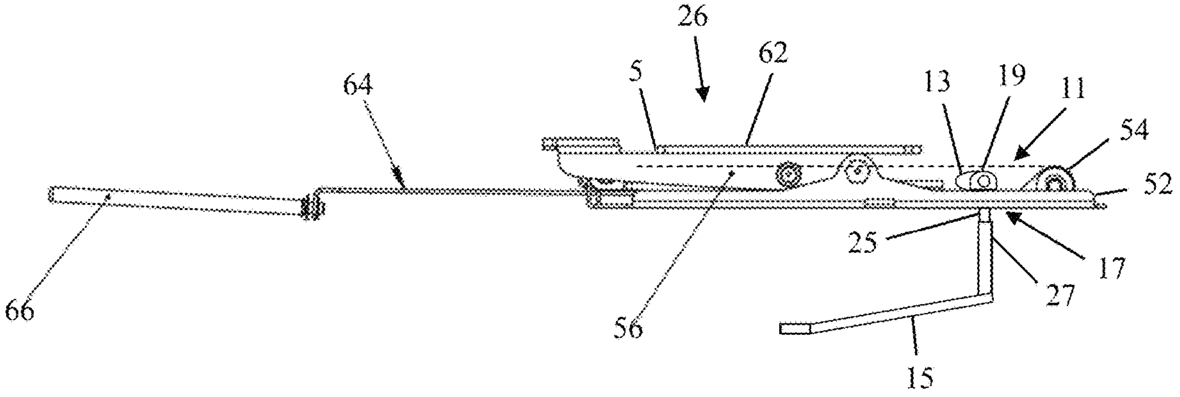
FIGS. 7-8 are side views of the actuator assembly of the foldable fretted instrument of FIGS. 1-3 with a first tremolo system according to aspects of the present disclosure, before operation (FIG. 7) and during operation (FIG. 8)
Figure 8:
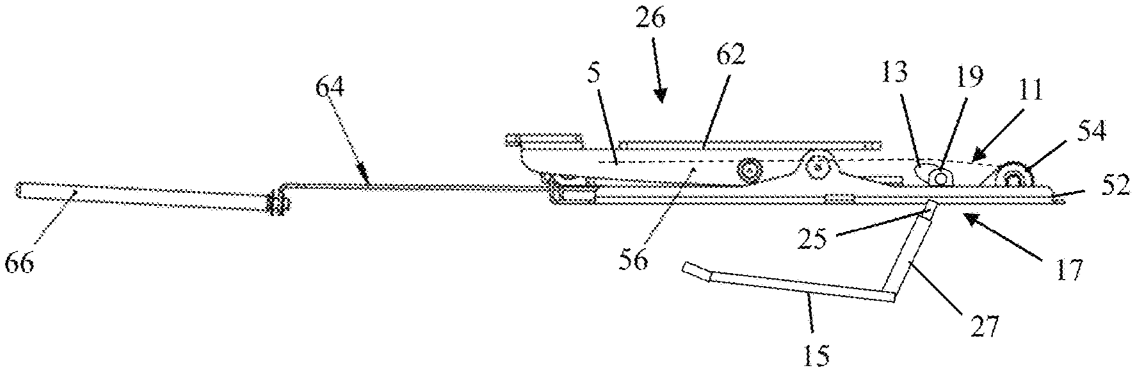

FIGS. 7-8 show the actuator assembly 26 of the foldable fretted instrument 10 of FIGS. 1-3 with a first tremolo system 11 according to aspects of the present disclosure, before operation (FIG. 7) and during operation (FIG. 8) of the tremolo system 11. By way of example only, the tremolo bar coupler 17 includes a threaded post 25 that extends through the tremolo bar aperture 23 formed in the body 12, and a corresponding aperture formed in the chassis 52 of the actuator 26, for threaded engagement with a threaded distal end 27 of the tremolo bar 15. The tremolo cam 13 (with oblong cross section) is rotatably mounted between the first and second mounting knuckles 19, 21 affixed to the actuator chassis 52 and rigidly coupled to the tremolo bar coupler 17, which rotates within the first mounting knuckle 19. Rotation of the tremolo bar 15 causes the tremolo cam 13 to bend the strings 5 for temporary pitch attenuation. By way of example, threaded distal end 27 of the tremolo bar 15 is a hollow cylinder with internal threads dimensioned to threadedly engage the threaded post 25 of the tremolo bar coupler 17. The tremolo bar coupler 17 is rotatably mounted to the first mounting knuckle 19. In some embodiments, the tremolo bar 15 may be longer than shown, in order to extend a sufficient distance from the surface of the body 12 of the instrument 10.

Figure 9:
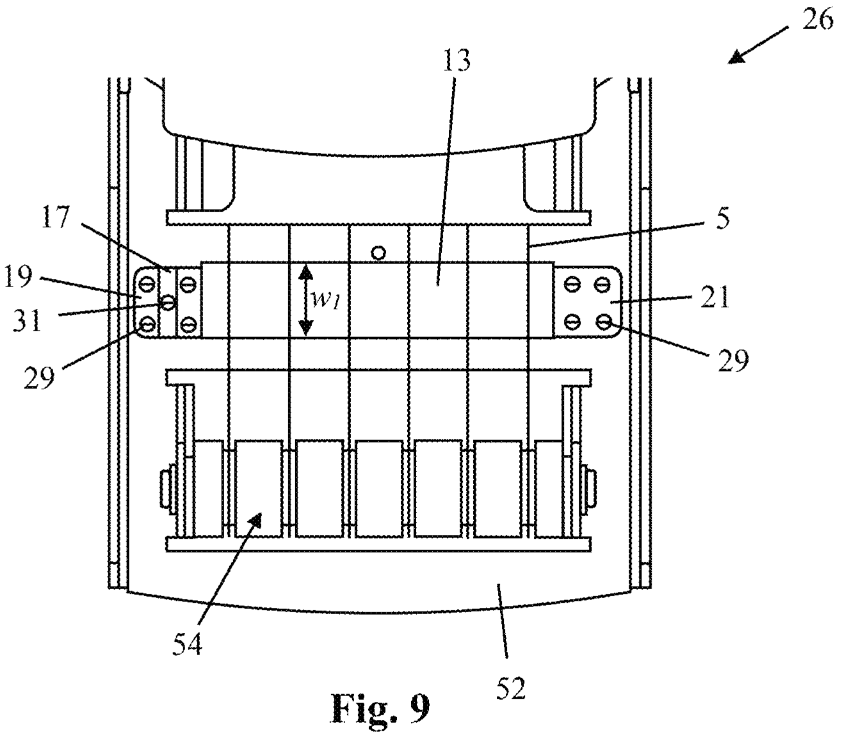
FIGS. 9-10 are top views of aspects of the actuator assembly of the foldable fretted instrument of FIGS. 1-3 with a first tremolo system according to aspects of the present disclosure, before operation (FIG. 9) and during operation (FIG. 10)
Figure 10:
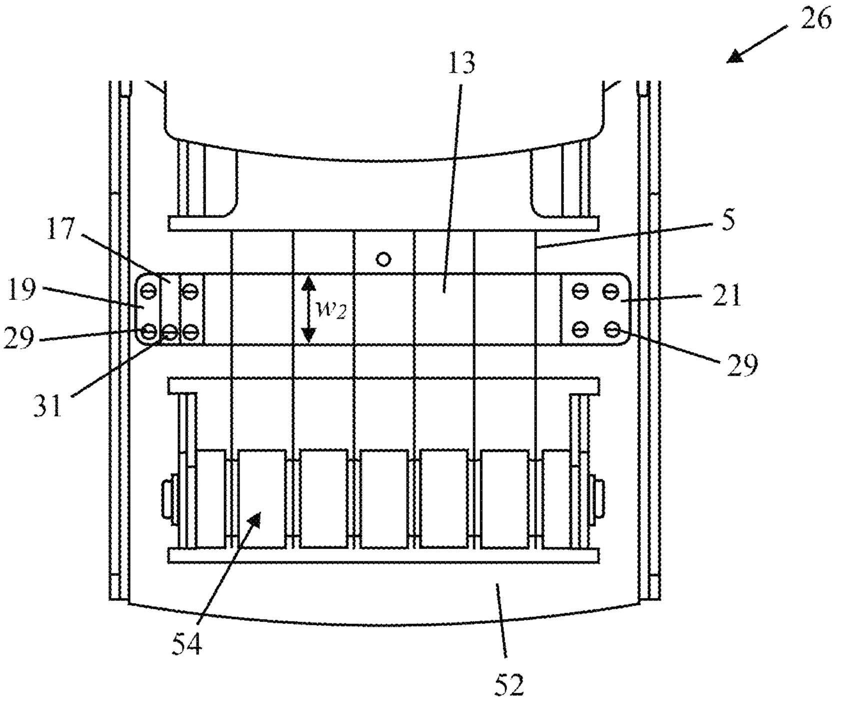

FIGS. 9-10 show the actuator assembly 26 of the foldable fretted instrument 10 of FIGS. 1-3 with a first tremolo system 11 according to aspects of the present disclosure, before operation (FIG. 9) and during operation (FIG. 10) of the tremolo system 11. By way of example only, the first and second mounting knuckles 19, 21 are mounted to the actuator chassis 52 via mounting screws 29 (or comparable fasteners). By way of example only, the first mounting knuckle 19 rotatably receives a first end of the tremolo cam 13, and the second mounting knuckle 21 rotatably receives a second end of the tremolo cam 13. The tremolo bar coupler 17 is rigidly connected to the tremolo cam 13 (e.g., via mounting screw 31) and threadedly connected to the tremolo bar 15 via threaded engagement between the threaded post 25 and the distal end 27 of the tremolo bar 15. The mounting knuckles 19, 21 allow the tremolo cam 13 to rotate when the tremolo bar 15 is rotated towards the upper surface of the instrument 10 (best shown in FIG. 8). More specifically, the tremolo bar coupler 17 drives rotation of the tremolo cam 13 under operation of the tremolo bar 15. The tremolo cam 13 has an oblong cross section (cam) that contacts and attenuates strings 5 when the tremolo bar 15 rotated towards the upper surface of the instrument 10.

By way of example only, as previously noted FIG. 9 illustrates the actuator assembly 26 prior to operation of the tremolo system 11. In this instance, the mounting screw 31 securing the tremolo bar coupler 17 to the tremolo cam 13 is centered on the bar coupler 17 and the tremolo cam 13 has a major cross-sectional width w/(e.g., due to its oblong cross-sectional shape) that is oriented generally parallel to, and not in contact with, the strings 5 (see, e.g., FIG. 7 for a side view of the tremolo cam 13 prior to operation). Additionally, in this initial pre-operation orientation, the tremolo cam 13 has a minor cross-sectional width $w_2$ positioned directly below the strings 5 and not in contact with the strings 5 (see, e.g., FIG. 11 for a depiction of the tremolo cam 13 positioned below the default plane $P_1$ of the strings 5).

By way of example only, as previously noted FIG. 10 illustrates the actuator assembly 26 during operation of the tremolo system 11. In this instance, the mounting screw 31 securing the tremolo bar coupler 17 to the tremolo cam 13 is displaced from center on the bar coupler 17 (visually), depicting rotation of the bar coupler 17. Moreover, the tremolo cam 13 has a minor cross-sectional width $w_2$ (e.g., due to its oblong cross-sectional shape) that is oriented generally parallel to, and not in contact with, the strings 5, while the major cross-sectional width $w_1$ is rotated to be in contact with the strings 5 (see, e.g., FIG. 8 for a side view of the tremolo cam 13 during operation and FIG. 12 for a depiction of the tremolo cam 13 rotated such that the major width dimension $w_1$ extends through the default plane $P_1$ of the strings 5 and contacts the strings 5).

Figure 11:
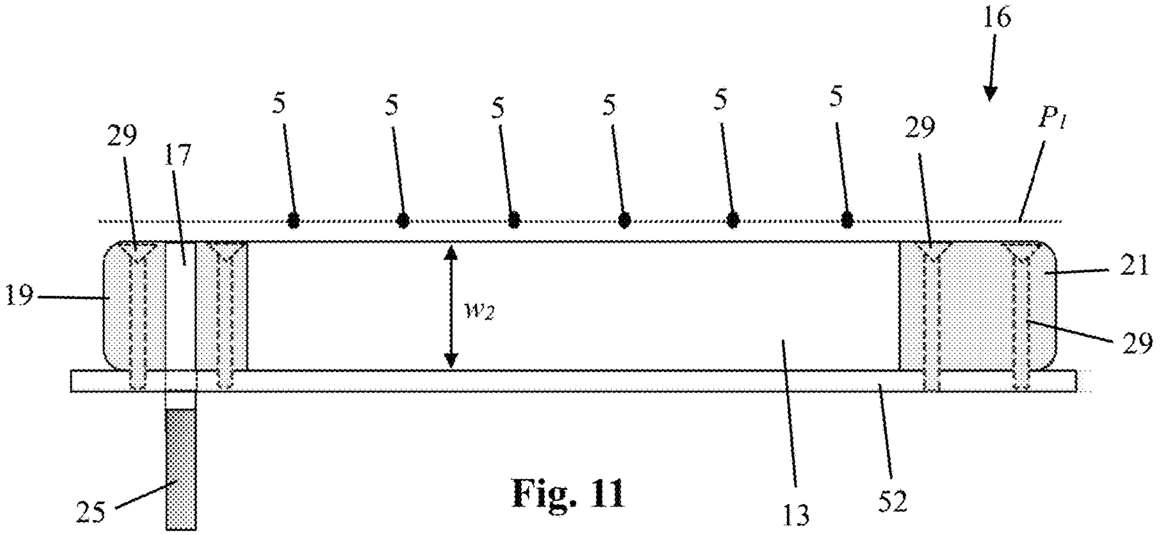
FIGS. 11-12 are end views of the actuator assembly of the foldable fretted instrument of FIGS. 1-3 with a first tremolo system according to aspects of the present disclosure, before operation (FIG. 11) and during operation (FIG. 12)
Figure 12:
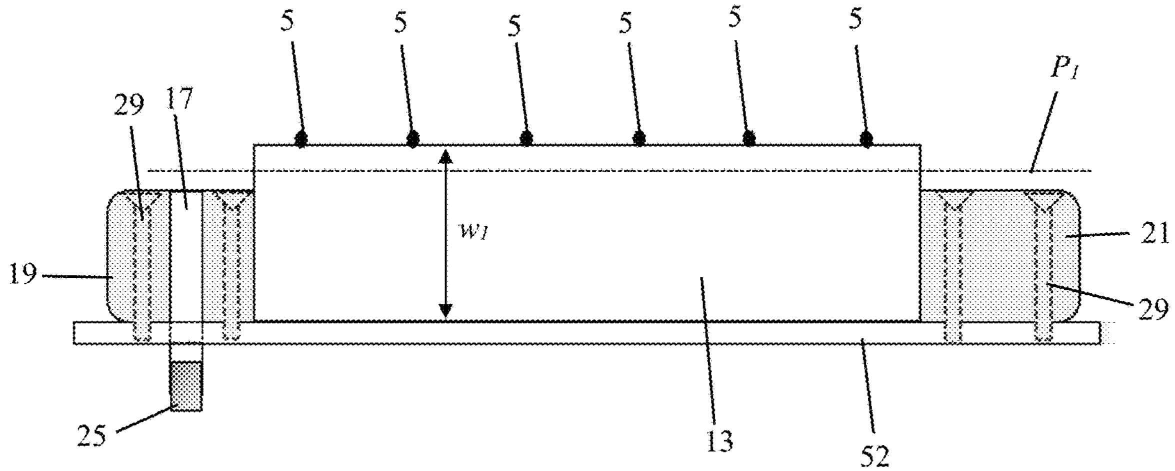
Figure 13A:
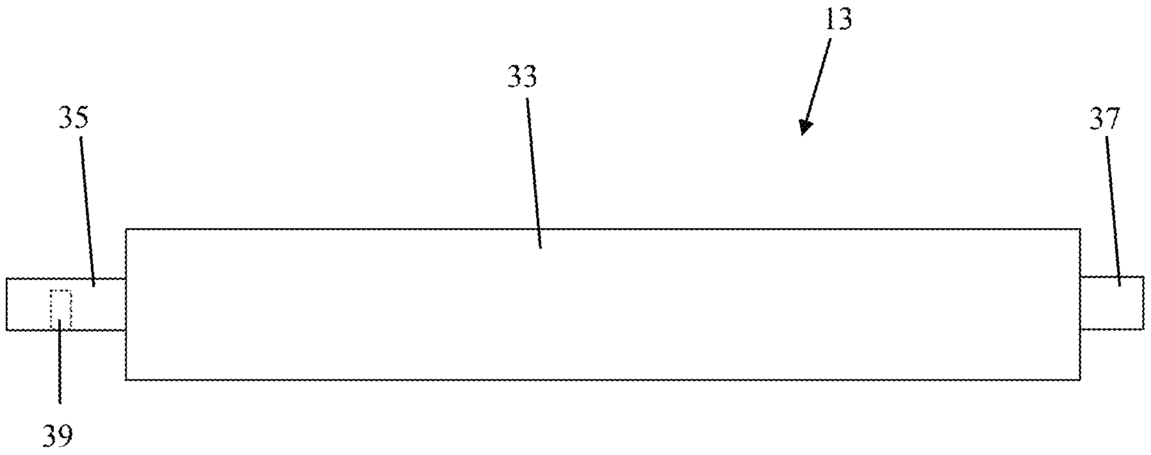
FIGS. 13A-14B are side views of an example of a tremolo cam and tremolo bar coupler forming part of the first tremolo system according to aspects of the present disclosure, before operation (FIG. 13) and during operation (FIG. 14)
Figure 13B:
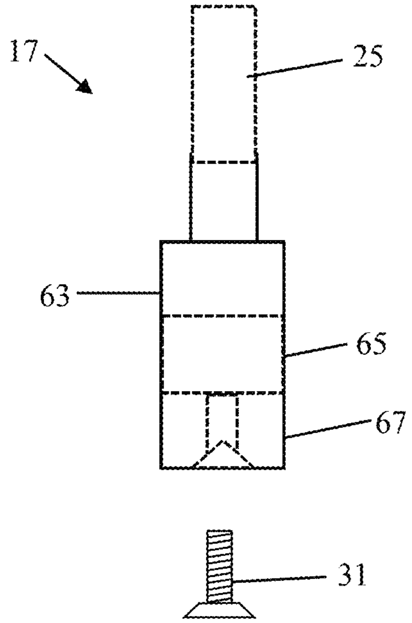
Figure 14A:
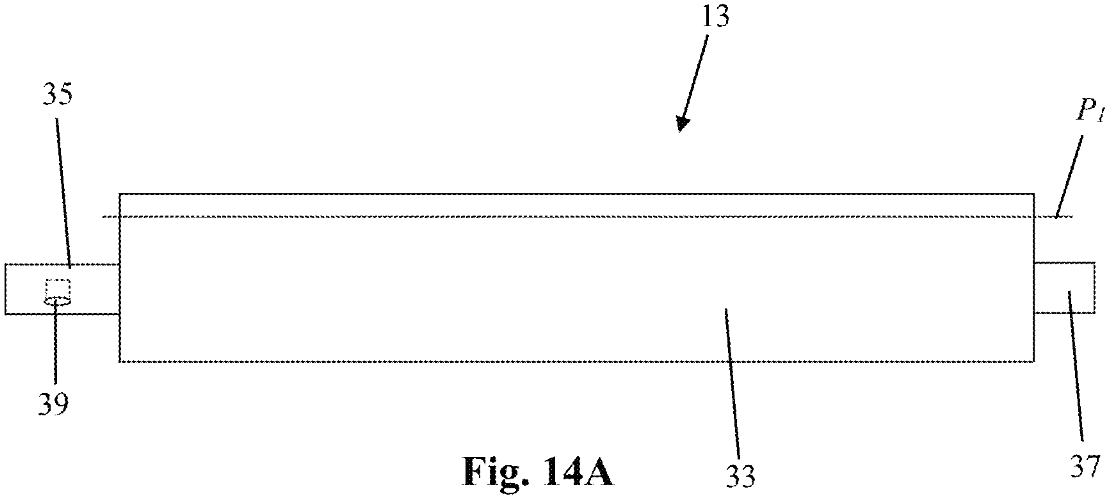
Figure 14B:
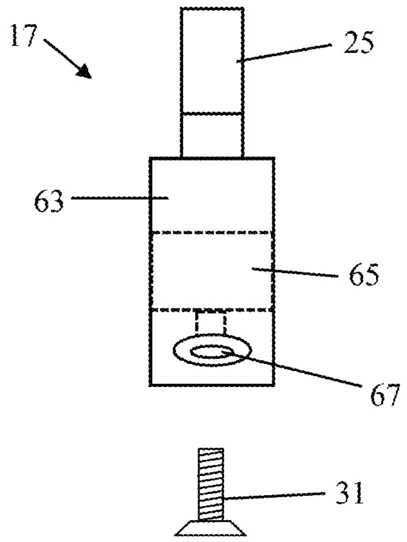

FIGS. 11-12 show the actuator assembly 16 of the foldable fretted instrument 10 of FIGS. 1-3 with the first tremolo system 11 according to aspects of the present disclosure, before operation (FIG. 11) and during operation (FIG. 12) of the tremolo system 11. By way of example only, the mounting knuckles 19, 21 are mounted to a surface of the actuator chassis 52. The first mounting knuckle 19 rotatably receives a first end of the tremolo cam 13 and allows to rotation of the tremolo cam 13 when the tremolo bar 15 is operated from front of the foldable fretted instrument 10. The tremolo bar coupler 17 is rotatably mounted relative to the first mounting knuckle 19 and is rigidly coupled to the tremolo cam 13 (e.g., via set screw 31). The tremolo bar coupler 17 includes a threaded post 25, which by way of example is a cylindrical extension with a threaded exterior at the distal end. The threaded exterior of the post 25 enables a threaded engagement within the threaded distal end 27 of the tremolo bar 15. When the tremolo bar 15 is rotated towards the surface of the instrument 10 (FIG. 8), the rotational force is transferred to the threaded post 25 of the bar coupler 17, which in turn drives rotation of the tremolo cam 13 to temporarily attenuate strings 5. The tremolo cam 13 has an oblong cross section (cam) having a major width dimension $w_1$ that contacts and attenuates strings 5 when the tremolo bar 15 is rotated towards the upper surface of the body 12. In some embodiments, the tremolo cam 13 may have a constant shape (as shown in FIG. 12) to contact all the strings 5 at the same time. Alternatively, in some embodiments the tremolo cam 13 may have one or more regions that are raised or lowered (e.g., regions that have different major width dimensions) to contact a respective string in a predetermined manner. For example, the tremolo cam 13 may have raised areas to specifically attenuate the G-string and/or B-string of the six guitar strings in standard E-A-D-G-B-E tuning of a guitar.

FIGS. 13A-14B show the tremolo cam 13 and tremolo bar coupler 17 of the first tremolo system 11 according to aspects of the present disclosure, before operation (FIGS. 13A-13B) and during operation (FIGS. 14A-14B) of the tremolo system 11. By way of example only, the tremolo cam 13 includes an oblong base 33 with first and second cylindrical posts 35, 37, which are dimensioned to respectively extend into (and rotate within) the mounting knuckles 19, 21. The first cylindrical post 35 includes a screw recess 39 configured to threadedly receive at least a threaded portion of a mounting screw 31 therein to couple the tremolo cam 13 to the bar coupler 17. The oblong base 33 of the tremolo cam 13 has an asymmetric cross-section, including a major width dimension $w_1$ and a minor width dimension $w_2$, such that, when the tremolo system 11 is not in use, the oblong base 33 does not contact the strings 5 (FIG. 11), and when the tremolo bar 15 is rotated during use, the oblong base 33 does contact and attenuate the strings 5 (FIG. 12). By way of example only, the tremolo bar coupler 17 includes a cylindrical base 63 configured to rotate on the first mounting knuckle 19. The threaded post 25 is integrally connected to the cylindrical base 63 and includes a threaded exterior to be threadedly received within the threaded distal end 27 of the tremolo bar 15. The cylindrical base 63 of the bar coupler 17 includes a coupling channel 65 dimensioned to receive the first cylindrical post 35 of the tremolo cam 13 therethrough and a threaded aperture 67 dimensioned to threadedly receive a mounting screw 31 to couple the bar coupler 17 to the first cylindrical post 35 of the tremolo cam 13, for example when first cylindrical post 35 is positioned within the coupling channel 65 with the screw recess 39 and threaded aperture 67 in alignment. When the tremolo bar 15 is engaged with the bar coupler 17, then rotation of the tremolo bar 15 will cause the threaded post 25 of the bar coupler 17 and the oblong base 33 to rotate and thereby temporarily contact and attenuate the strings 5.

Figure 15:
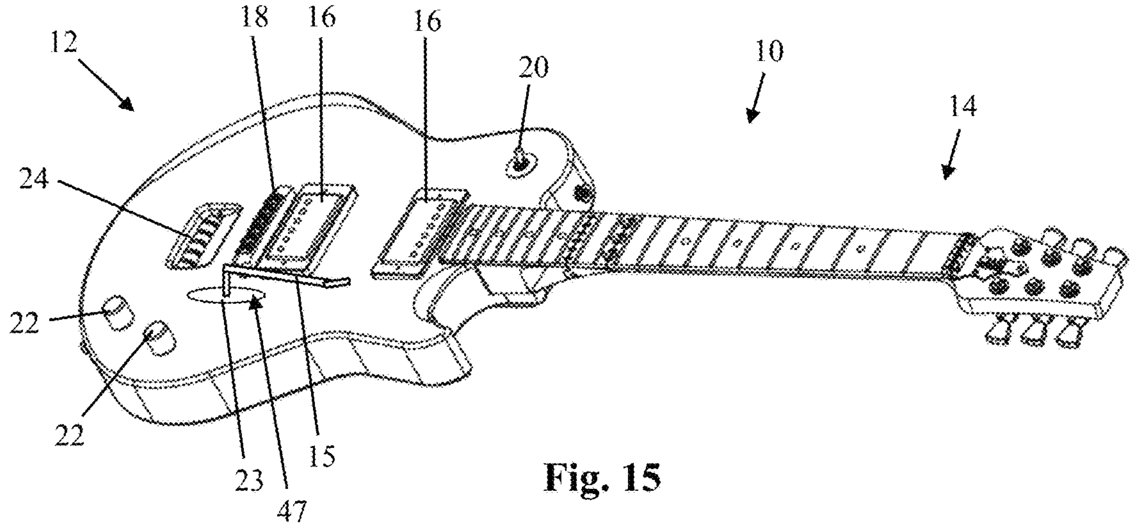
FIGS. 15-17 are perspective, side, and bottom views of a foldable fretted instrument with an example of a second tremolo system according to aspects of the present disclosure.
Figure 16:
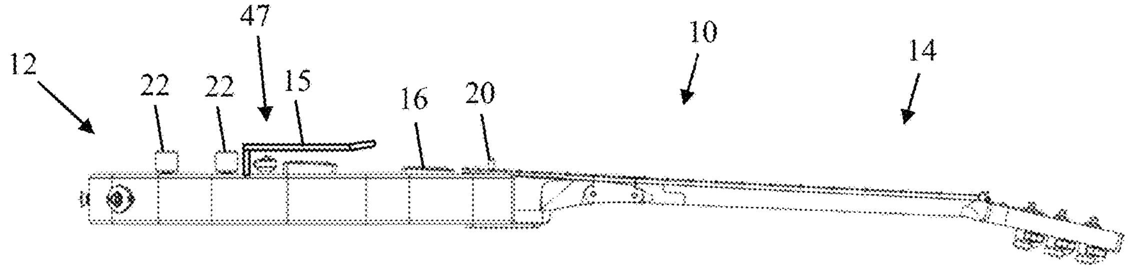
Figure 17:
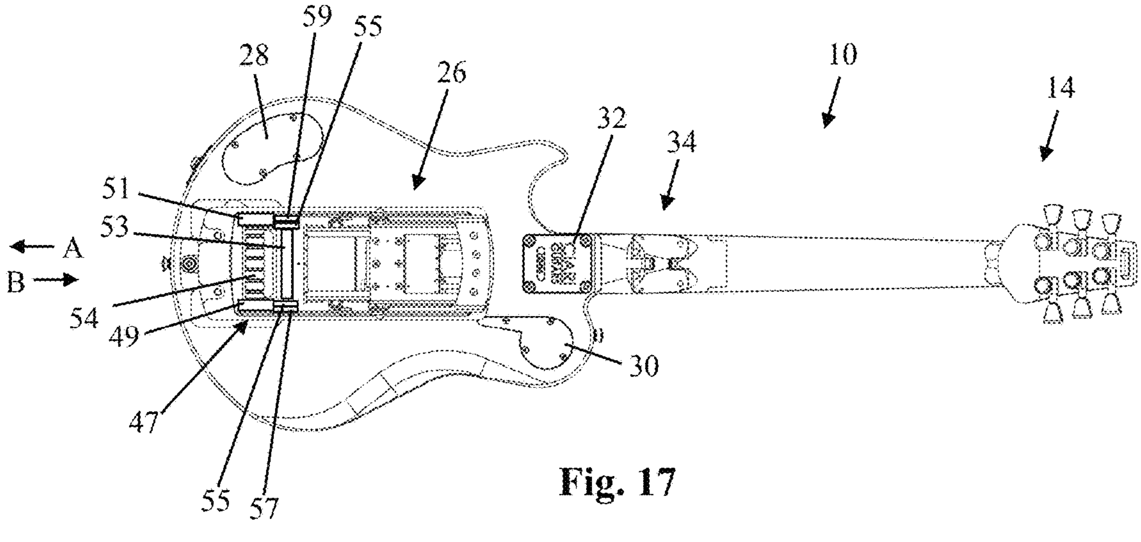

FIGS. 15-17 are perspective, side, and bottom views of a foldable fretted instrument 10 with an example of a second tremolo system 47 according to aspects of the present disclosure. By way of example only, the second tremolo system 47 includes the string roller assembly 54 of the actuator 26 mounted between a pair of rocker assemblies 49, 51. Each rocker assembly 49, 51 is capable of moving back and forth along the longitudinal axis of the actuator 26. In some embodiments, an axle 53 is rotatably mounted to the actuator 26 and includes a threaded post (not shown) extending towards the top surface of the guitar body 12 for threaded engagement with the tremolo bar 15. The axle 53 is connected to the rocker assemblies 49, 51 via a pair of linkages 55, which serve to push or pull the rocker assemblies 49, 51 (and string roller assembly 54) depending on the rotation of the axle 53. Rotation of the tremolo bar 15 (extending through guitar body 12) causes the rocker assemblies 49, 51 (and string roller assembly 54) to move back or forth to respectively raise or lower the string pitch.

Figure 18:
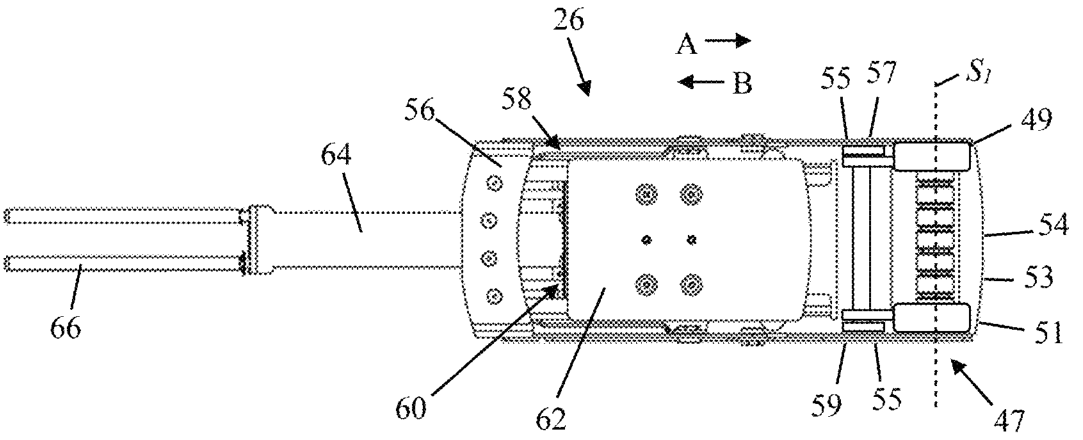
FIGS. 18-20 are top views of an example of an actuator assembly of the foldable fretted instrument of FIGS. 15-17 with a second tremolo system according to aspects of the present disclosure, before operation (FIG. 18), during operation raising the string pitch (FIG. 19), and during operation lowering the string pitch (FIG. 20)
Figure 19:
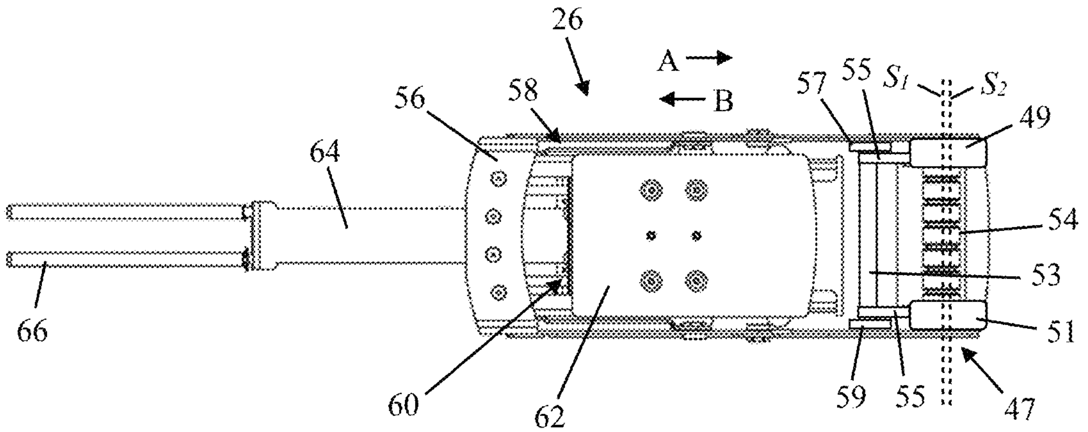
Figure 20:
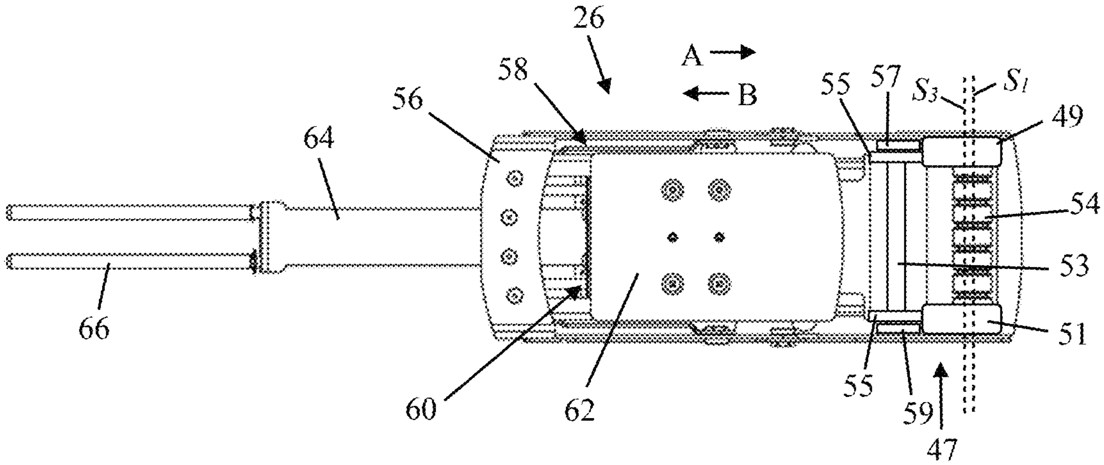

FIGS. 18-20 show of the actuator assembly 26 of the foldable fretted instrument 10 of FIGS. 1-3 with a second tremolo system 47 according to aspects of the present disclosure, before operation (FIG. 18), during operation raising the string pitch (FIG. 19), and during operation lowering the string pitch (FIG. 20). In some embodiments, the rocker assemblies 49, 51 are configured to move back (e.g., linearly in Direction A) and forth (e.g., linearly in Direction B) when the tremolo bar 15 is rotated toward and away from the upper surface of the body 12. The tremolo bar 15 is coupled to the axle 53 via a threaded post (not shown), which extends from the axle 53 through the actuator chassis 52. Linkages 55 rigidly connect the axle 53 to each rocker assembly 49, 51. The axle 53 rotates clockwise or counter-clockwise between the mounting blocks 57, 59 when the tremolo bar 15 is rotated towards or away from the body 12. When the axle 53 is rotated under direction of the tremolo bar 15, the linkages 55 push or pull the rocker assemblies 49, 51 either away (e.g., in Direction A) or towards (e.g., in Direction B) to respectively lower or raise string pitch. By way of example, the relative positioning of the string roller assembly 54 in the resting state is denoted by line $S_1$ in FIG. 18.

As best shown in FIG. 19, for example to increase the string pitch the rocker assemblies 49, 51 are moved in Direction A when the tremolo bar 15 is rotated towards surface of the body 12. When the tremolo bar 15 is rotated, the axle 53 rotates clockwise and causes the linkages 55 to push the rocker assemblies 49, 51 (and string roller assembly 54) in Direction A to temporarily raise the pitch of the strings. Releasing the tremolo bar 15 will allow the rocker assemblies 49, 51 (and String Roller Assembly 54) to return to the resting position and normal string pitch. By way of example, the relative positioning of the string roller assembly 54 in the raised pitch state is denoted by line $S_2$ in FIG. 19.

As best shown in FIG. 20, for example to lower the string pitch the rocker assemblies 49, 51 are moved in Direction B when the tremolo bar 15 is rotated away from the surface of the body 12. When the tremolo bar 15 is rotated, the axle 53 rotates counter-clockwise and causes the linkages 55 to pull the rocker assemblies 49, 51 (and string roller assembly 54) in Direction B to temporarily lower the pitch of the strings. Releasing the tremolo bar 15 will allow the rocker assemblies 49, 51 (and string roller assembly 54) to return to the resting position and normal string pitch. By way of example, the relative positioning of the string roller assembly 54 in the lowered pitch state is denoted by line $S_3$ in FIG. 20.

Figure 21:
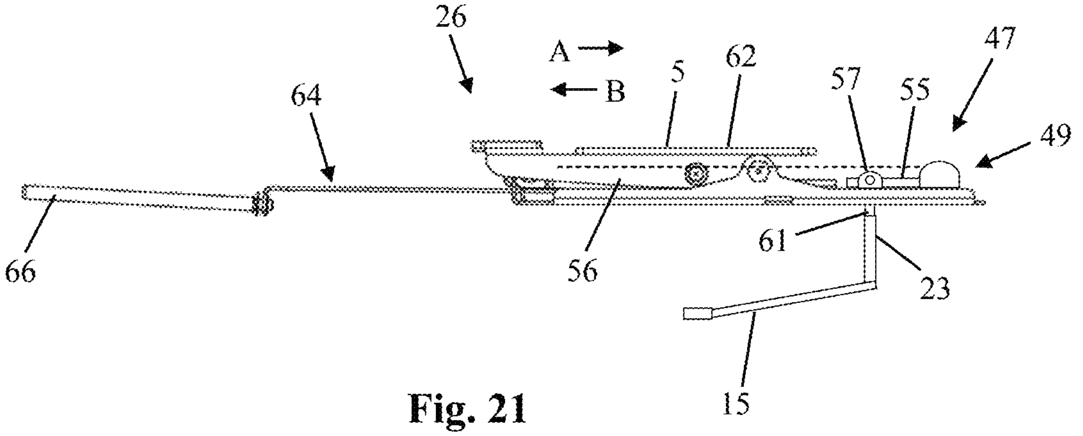
FIGS. 21-23 are side views of the actuator assembly of the foldable fretted instrument of FIGS. 15-17 with a second tremolo system according to aspects of the present disclosure, before operation (FIG. 21), during operation raising the string pitch (FIG. 22), and during operation lowering the string pitch (FIG. 23).
Figure 22:
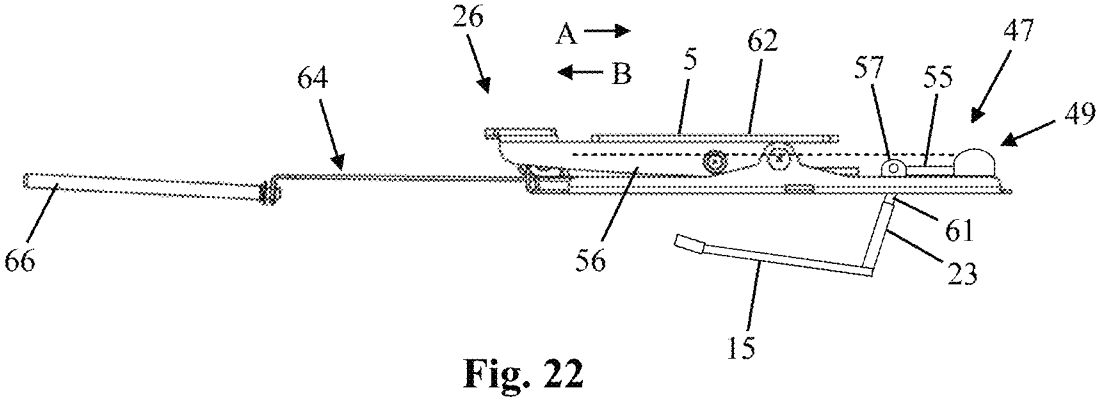
Figure 23:
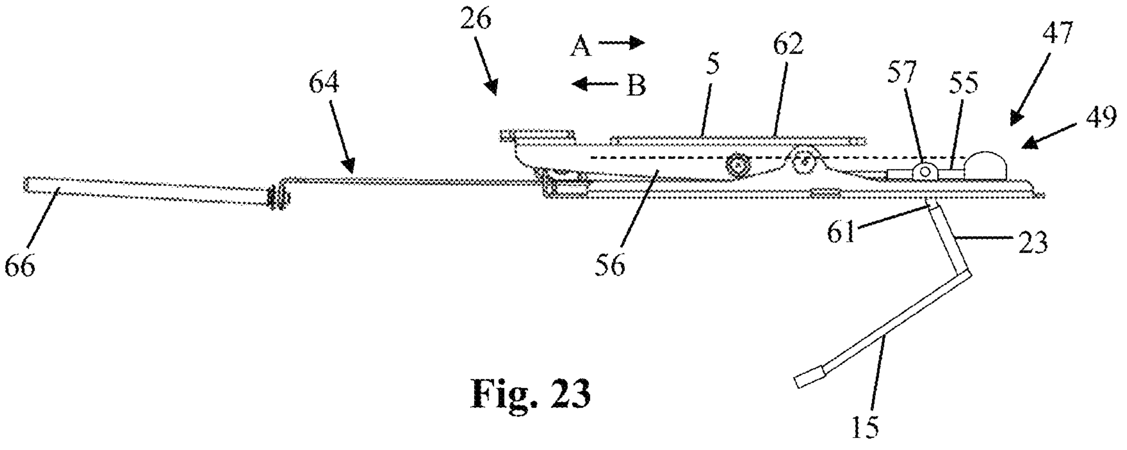

FIGS. 21-23 show the actuator assembly 26 of the foldable fretted instrument 10 of FIGS. 1-3 with the second tremolo system 47 according to aspects of the present disclosure, before operation (FIG. 21), during operation raising the string pitch (FIG. 22), and during operation lowering the string pitch (FIG. 23). By way of example only, the axle 53 has a threaded post 61 which extends through the tremolo bar aperture 23 formed in the body 12, and a corresponding aperture (not shown) formed in the chassis 52 of the actuator assembly 26, for threaded engagement with the threaded distal end 27 of the tremolo bar 15. When the tremolo bar 15 is rotated, the linkages 55 extending between the axle 53 and the rocker assemblies 49, 51 will move back or forth to temporarily raise or lower the string pitch.

As best shown in FIG. 22, for example to increase the string pitch the tremolo bar 15 is rotated downwards towards the body 12. The linkages 55 extending between the axle 53 and the rocker assemblies 49, 51 will push the rocker assemblies 49, 51 (and the string roller assembly 54) in Direction A to temporarily raise the string pitch. Releasing the tremolo bar 15 will allow the rocker assemblies 49, 51 (and string roller assembly 54) to return to the resting position and normal string pitch.

As best shown in FIG. 23, for example to lower the string pitch the tremolo bar 15 is rotated upwards away the body 12. Linkages 55 extending between the axle 53 and the rocker assemblies 49, 51 will pull the rocker assemblies 49, 51 (and the string roller assembly 54) in Direction B to temporarily lower the string pitch. Releasing the tremolo bar 15 will allow the rocker assemblies 49, 51 (and string roller assembly 54) to return to the resting position and normal string pitch.

Any of the features or attributes of the above the above-described embodiments and variations can be used in combination with any of the other features and attributes of the above-described embodiments and variations as desired. From the foregoing disclosure and detailed description of certain preferred embodiments, it is also apparent that various modifications, additions, and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A foldable stringed instrument, comprising:

a body having a front, a back, an actuator recess formed in the back with a first end and a second end opposite said first end, and a neck recess formed in the front generally adjacent to said first end of said actuator recess, and a string aperture extending between said front and back;

a neck mounted within said neck recess of said body, said neck having a hinge configured to allow the neck to be positioned into a folded configuration and a straight configuration;

an actuator mounted within said actuator recess of said body, said actuator including a chassis mounted within said actuator recess, a rotatable handle hingedly coupled to said chassis, and a translating tail piece moveable in a first direction towards said first end of said actuator recess when said rotatable handle is rotated towards said first end of said actuator recess and a second direction towards said second end of said actuator recess when said rotatable handle is rotated towards said second end of said actuator recess said rotatable handle having a pair of connecting arms hingedly coupled to said chassis and a handle member extending generally perpendicularly between said pair of connecting arms, said rotatable handle having a longitudinal axis generally parallel to a longitudinal axis of said chassis and rotatable between a locked state wherein said handle member is positioned in said first end of said actuator recess to bring strings coupled to said tail piece to a tensioned state for play and an unlocked state wherein said handle member is positioned in said second end of said actuator recess to bring said strings to a detensioned state for folding said neck;

a string roller assembly mounted on said chassis and positioned adjacent to said string aperture of said body such that said strings extend from said tail piece, around said string roller assembly, through said string aperture of said body and onward for connection to tuning machines mounted to said neck after passing over a saddle located on said body and a nut located on said neck; and a tremolo assembly mounted on said chassis and positioned adjacent to said string roller assembly, said tremolo assembly operable to affect one or more instrument strings to at least one of raise and lower string pitch.

2. The foldable stringed instrument of claim 1, wherein the tremolo assembly comprises a cam member for selectively contacting and stretching the strings for temporary string attenuation, a bar rotatable from said front of said body, and a bar coupler extending between the cam member and the bar.

3. The foldable stringed instrument of claim 2, wherein the bar extends through an aperture formed in the front of said body.

4. The foldable stringed instrument of claim 2, wherein the cam member and bar coupler are rotatably mounted to the actuator.

5. The foldable stringed instrument of claim 2, wherein the cam member has an oblong cross-sectional shape.

6. The foldable stringed instrument of claim 5, wherein the oblong cross-sectional shape is one of elliptical and oval.

7. The foldable stringed instrument of claim 2, wherein the tremolo assembly has a first state in which the cam member is not in contact with the instrument strings, and a second state in which the cam member contacts at least one instrument string.

8. The foldable stringed instrument of claim 7, wherein the cam member is rotatable between the first and second states.

9. The foldable stringed instrument of claim 8, wherein movement of the bar causes rotation of the cam member.

10. The foldable stringed instrument of claim 1, wherein the tremolo assembly comprises a a bar rotatable from said front of said body, a pair of rocker assemblies mounted on either side of the string roller assembly, and an axle rotatably mounted to the actuator and connected to each of the rocker assemblies.

11. The foldable stringed instrument of claim 10, wherein the axle is connected to the rocker assemblies by way of linkage members.

12. The foldable stringed instrument of claim 10, wherein the bar is rotatable in a first direction to cause the rocker assemblies and string roller assembly to translate in a first direction.

13. The foldable stringed instrument of claim 12, wherein translation of the rocker assemblies and string roller assembly in the first direction raises the string pitch.

14. The foldable stringed instrument of claim 12, wherein the bar is rotatable in a second direction opposite the first direction to cause the rocker assemblies and string roller assembly to translate in a second direction.

15. The foldable stringed instrument of claim 14, wherein translation of the rocker assemblies and string roller assembly in the second direction lowers the string pitch.

* * * * *